US012758871B2

(12) United States Patent
Zvenigorodsky

(10) Patent No.: US 12,758,871 B2
(45) Date of Patent: Oct. 13, 2026

(54) EVENT DRIVEN DYNAMIC SWITCHING BETWEEN GAME MODES

(71) Applicant: Sony Interactive Entertainment LLC, San Mateo, CA (US)

(72) Inventor: Alex Zvenigorodsky, Redwood City, CA (US)

(73) Assignee: Sony Interactive Entertainment LLC

( * ) Notice: Subject to any disclaimer, the term of this patent is extended or adjusted under 35 U.S.C. 154(b) by 267 days.

(21) Appl. No.: 18/220,421

(22) Filed: Jul. 11, 2023

(65) Prior Publication Data

US 2025/0018287 A1 Jan. 16, 2025

(51) Int. Cl.
*A63F 13/355* (2014.01)

(52) U.S. Cl.
CPC ...... *A63F 13/355* (2014.09); *A63F 2300/538* (2013.01)

(58) Field of Classification Search
CPC ......................... A63F 13/355; A63F 2300/538
See application file for complete search history.

(56) References Cited

U.S. PATENT DOCUMENTS 8,797,330 B1 * 8/2014 Haase ................... G06F 3/0481 345/473
10,311,548 B2 6/2019 Burch et al.
10,313,679 B2 * 6/2019 Kopietz ............... H04N 19/154
10,322,351 B2 * 6/2019 Marr ................... G07F 17/3227
2007/0211055 A1 * 9/2007 Stein ....................... G06T 15/00 345/428
2008/0117204 A1 5/2008 Thorn
2015/0251092 A1 9/2015 Chu et al.
2016/0001181 A1 * 1/2016 Marr .................. G07F 17/3227 463/42
2017/0109935 A1 4/2017 Löffler et al.
(Continued)

FOREIGN PATENT DOCUMENTS

JP 2011015129 1/2011

OTHER PUBLICATIONS

International Search Report and Written Opinion for International Application No. PCT/US2024/026054, dated Jul. 25, 2024.
(Continued)

*Primary Examiner* — Ankit B Doshi
(74) *Attorney, Agent, or Firm* — Kilpatrick Townsend & Stockton LLP

(57) ABSTRACT

A device, system, and computer program product for automatically switching between quality modes for an application based on signals from the application. The device includes an application renderer configured to render the application in a first quality mode. The application renderer being further configured to switch from rendering the application in a first quality mode to a second quality mode when a signal is detected from the application. The signal may be a rendering mode switch message provided by the application, detected from image frames of the application or detected from information received from the application (e.g., audio). The signal may indicate rendering settings of the second quality mode. The rendering settings may include, active shaders, texture resolution, level of geometry detail, MIP map level, Anisotropic filtering, up-sampling level, anti-aliasing, Raytracing and global illumination.

20 Claims, 6 Drawing Sheets

(56) References Cited

U.S. PATENT DOCUMENTS

| | | | | |
|---|---|---|---|---|
| 2018/0233075 | A1 | 8/2018 | Boyd | |
| 2018/0310008 | A1* | 10/2018 | Kopietz | H04N 19/85 |
| 2018/0310009 | A1* | 10/2018 | Kopietz | A63F 13/352 |
| 2018/0357780 | A1 | 12/2018 | Young et al. | |
| 2019/0221027 | A1 | 7/2019 | Petkov et al. | |
| 2019/0253720 | A1* | 8/2019 | Kopietz | A63F 13/52 |
| 2019/0299097 | A1* | 10/2019 | Hadjadj | G06T 15/80 |
| 2020/0082794 | A1* | 3/2020 | Sanders | G06F 3/013 |
| 2020/0154112 | A1* | 5/2020 | Kopietz | H04N 19/172 |
| 2020/0346109 | A1 | 11/2020 | Kavallierou | |
| 2021/0109585 | A1* | 4/2021 | Fleming | G06F 1/3234 |
| 2021/0146240 | A1* | 5/2021 | Colenbrander | A63F 13/335 |
| 2021/0225067 | A1 | 7/2021 | Guo | |
| 2021/0339144 | A1 | 11/2021 | Gray et al. | |
| 2023/0206329 | A1* | 6/2023 | Cella | G06Q 20/0855 |
| 2023/0214925 | A1* | 7/2023 | Cella | G06Q 30/06<br>705/37 |

OTHER PUBLICATIONS

U.S. Appl. No. 18/220,406 to Alex Zvenigorodsky et al., filed Jul. 11, 2023.

U.S. Appl. No. 18/220,426 to Alex Zvenigorodsky et al., filed Jul. 11, 2023.

"Dynamic resolution Scaling has become a common" Ask a Game Dev, Published, Nov. 24, 2020. Accessed Jun. 14, 2023, Available Online at: https://askagamedev.tumblr.com/post/635692229684510720/dynamic-resolution-scaling-has-become-a-common.

Battaglia, Alex "Radeon Boost analysed: is AMD's new dynamic resolution technology a game-changer?" Eurogamer, Published Dec. 19, 2019. Accessed: Jun. 14, 2023, Available at: https://www.eurogamer.net/digitalfoundry-2019-radeon-software-adrenalin-2020-radeon-boost-analysis.

Hdeep "What Is Dynamic Resolution Scaling? Real-time Rendering will Prioritize the FPS" Define CPU, Aug. 22, 2022, Accessed: Jun. 14, 2023, available at: https://definecpu.com/dynamic-resolution-scaling/.

U.S. Appl. No. 18/220,406, "Non-Final Office Action", May 29, 2025, 29 pages.

U.S. Appl. No. 18/220,426, "Non-Final Office Action", May 29, 2025, 12 pages.

PCT/US2024/026050, "International Search Report and Written Opinion", Sep. 19, 2024, 10 pages.

PCT/US2024/026057, "International Search Report and Written Opinion", Aug. 27, 2024, 7 pages.

"Adding a Screen Resolution Option Adventure Creator", Available online at https://adventurecreator.org/tutorials/adding-screen-resolution-option, Sep. 13, 2016.

EP24840218.2, "Extended European Search Report", Mar. 9, 2026, 9 pages.

* cited by examiner

EVENT DRIVEN DYNAMIC SWITCHING BETWEEN GAME MODES

CROSS-REFERENCE TO RELATED APPLICATION

This application is a related application to commonly-assigned, co-pending application Ser. No. 18/220,406 filed Jul. 11, 2023, and co-pending application Ser. No. 18/220,426 filed Jul. 11, 2023, the entire disclosures of which are incorporated herein by reference in their entirety for all purposes.

FIELD OF THE DISCLOSURE

Aspects of the present disclosure relate to adjustment of rendering settings for an application, specifically aspects of the present disclosure relate to changing of quality modes with a dedicated control.

BACKGROUND OF THE DISCLOSURE

Modern applications often have many settings for the renderer that allow image frames from an application to be rendered with more or less detail, resolution or special effects. Rendering image frames from the application with more detail, resolution, or special effects slows down the rendering process as more processing cycles may be required to generate the image frame. Additionally, other settings which refine the look of the image in the image frame such as super sample anti-aliasing may require rendering portions of the image frames at a high resolution and then down-sampling portions of the high-resolution image frame to reduce jagged edges within the image, this is also process cycle intensive. Process-cycle-intensive rendering settings may slow down the operation of the application because operations in the application may depend on rendering of the image frame. This may cause errors, hang-ups or sluggishness which may detract from the user experience of the application. Thus, there may be a tradeoff between efficient application operation and generation of detailed, high resolution image frames and special effects.

Applications such as video games may generate image frames of varying detail. Generally, less detailed image frames require less processing to generate than more detailed image frames. As such during the runtime of an application, optimal rendering settings which provide efficient application operation and highest possible image quality may change. For example when the application generates image frames containing less detail more process intensive rendering settings (and thus more detailed portions of the overall less detailed image frame) may be possible without affecting the operation of the application while when the application generates image frames containing more detail, less process intensive rendering settings (an thus less detail in the overall more detailed image frame) may be needed to run the application without affecting operation of the application.

Currently, the most common method for changing rendering settings requires the user of the application to navigate settings menus and manually set the rendering settings for the application. This is both time consuming and requires the user to understand what effects the rendering settings have on rendering image frames. Dynamic Resolution Scaling (DRS) is an existing way to automatically change resolution while an application is running. DRS relies on frame rendering times or frame rates to estimate when to change resolution. As such DRS has many quirks that make for a less desirable user experience for example if the application is paused on a very detailed screen, the resolution will be low for the paused screen even though a high frame rate is not required.

It is within this context that aspects of the present disclosure arise.

BRIEF DESCRIPTION OF THE DRAWINGS

The teachings of the present disclosure can be readily understood by considering the following detailed description in conjunction with the accompanying drawings, in which.

DESCRIPTION OF THE SPECIFIC EMBODIMENTS

Although the following detailed description contains many specific details for the purposes of illustration, anyone of ordinary skill in the art will appreciate that many variations and alterations to the following details are within the scope of the disclosure. Accordingly, examples of embodiments of the invention described below are set forth without any loss of generality to, and without imposing limitations upon, the claimed disclosure.

A realization of the current disclosure is that there are some instances while running an application that a reduced frame rate is acceptable. This is in contrast to prior techniques which prioritize frame rate and frame to frame rendering time. Additionally, the present disclosure realizes that user may want to quickly customize rendering settings for an application without digging for settings in the menus which can be distracting and detract from the user experience. Aspects of the present disclosure allow a user to quickly switch between quality modes for an application. The quality mode may have rendering settings that are different for each mode. These different rendering settings in the quality modes may be set by the application developer or customized by the user.

Figure 1:
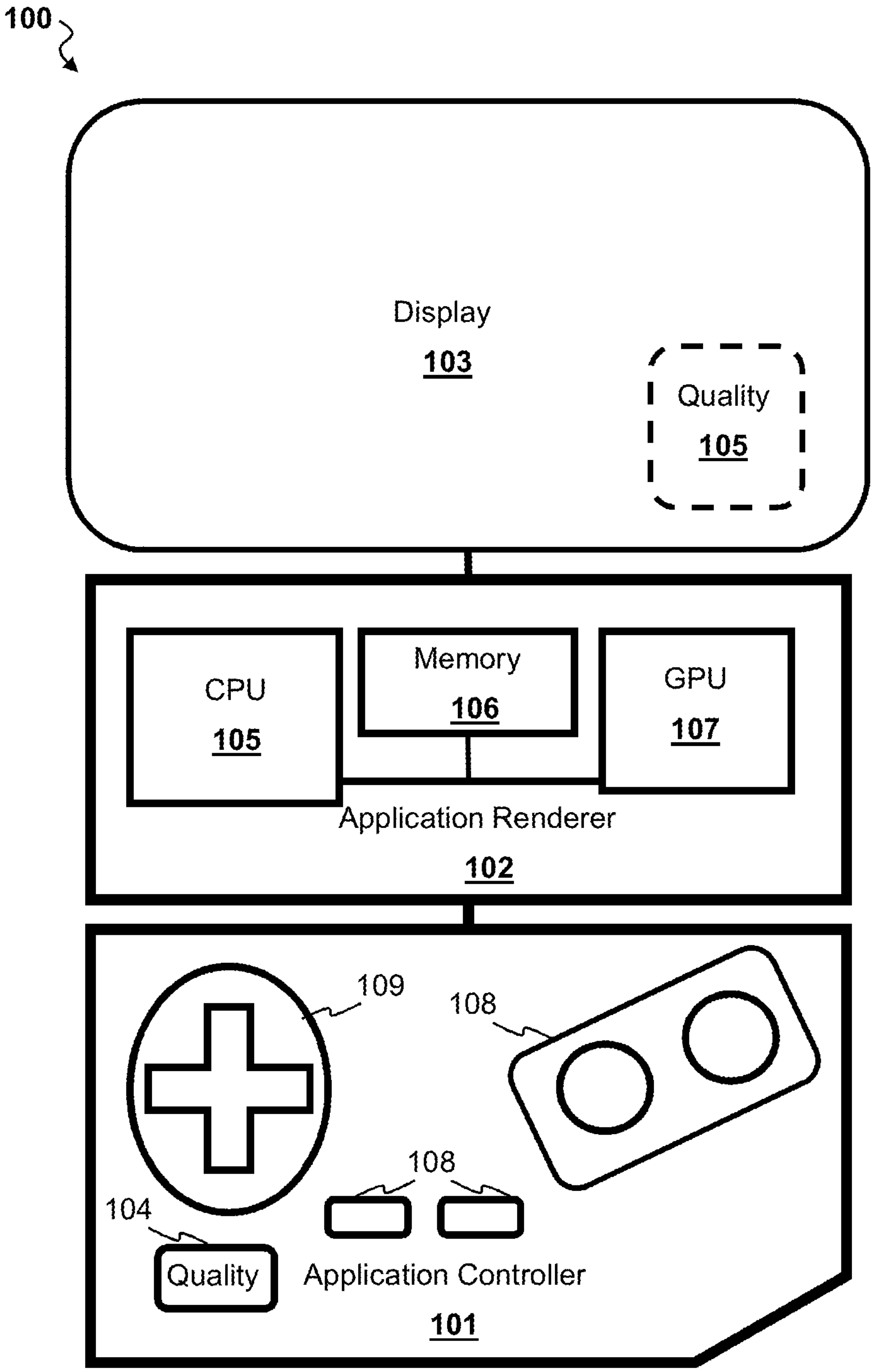
FIG. 1 is a block diagram showing a device for quickly changing between quality modes according to aspects of the present disclosure.

FIG. 1 is a block diagram showing a device for quickly changing between quality modes according to aspects of the present disclosure. As shown, the device 100 includes an application controller 101, an application renderer 102 and a display 103. The controller 101 may include a dedicated quality mode control 104, which may be a physical control such as a physical button. Alternatively, the display may include a dedicated virtual quality mode control 105.

The Application controller (or controller) 101 includes a dedicated quality mode control 104. Additionally, the application controller 101 may include one or more function buttons 108 and/or one or more input controls 109. The input controls may be for example, a direction pad (D-Pad), a joystick, a thumb stick, a touch pad, or inertial measurement units.

Activation of the dedicated quality mode control 104 or 105 provides a signal to the application renderer to switch from rendering an application in a first quality mode to rendering the application in a second quality mode. The dedicated quality mode control may be configured to provide the signal via suitable circuitry in the application controller 101. For example, the quality mode control may be a switch that when activated, causes an electrical pulse to travel to the application renderer, which includes hardware or software logic that switches the application renderer 102 from one quality mode to another in response to the electrical pulse. In implementations with a dedicated virtual quality mode control, the dedicated virtual control 105 may be for example and without limitation a portion of the display defined by pixel locations. When a cursor is moved to the defined pixel location of the dedicated virtual control in the display and the mouse button is clicked, programming detects this click as the virtual control being pressed and a signal is sent to the application renderer indicating to switch quality modes. In some implementations display 103 may be a touchscreen and, in such instances, the dedicated virtual quality mode control may be activated when the touch screen elements detect a touch event in the location of the display that corresponds to the pixel location of the quality mode control. In implementations that include a touchscreen the application controller may be a part of the touch-screen display.

The Application renderer 102 may be for example and without limitation dedicated circuitry logic, such as an Application Specific Integrated Circuit (ASIC), a Field Programmable Gate Array (FPGA) or any other hardware component suitable to render an application. In some implementations the application renderer may include a general-purpose processor such as a microcontroller or Central Processing unit or core (CPU) 105. The application renderer may also include other support processors such as a Graphical Processing Unit (GPU) 107. Additionally, the application renderer may include memory 106 such as Random Access Memory (RAM) and/or read-only memory (ROM). In some implementations the application renderer is responsible for not only rendering the application but running some or all of the computations required for executing the application. The application may be stored in memory 106 or circuitry logic of the application renderer may be specifically arranged to create the application and render image frames from the application on the display. In some other implementations the application may be stored on a non-transitory computer readable medium or an external memory or storage. In some implementations the application renderer 102 may be located on a server or computer system remote to the controller 101 and display 103 and may receive signals from the quality mode button over a network.

Figure 2:
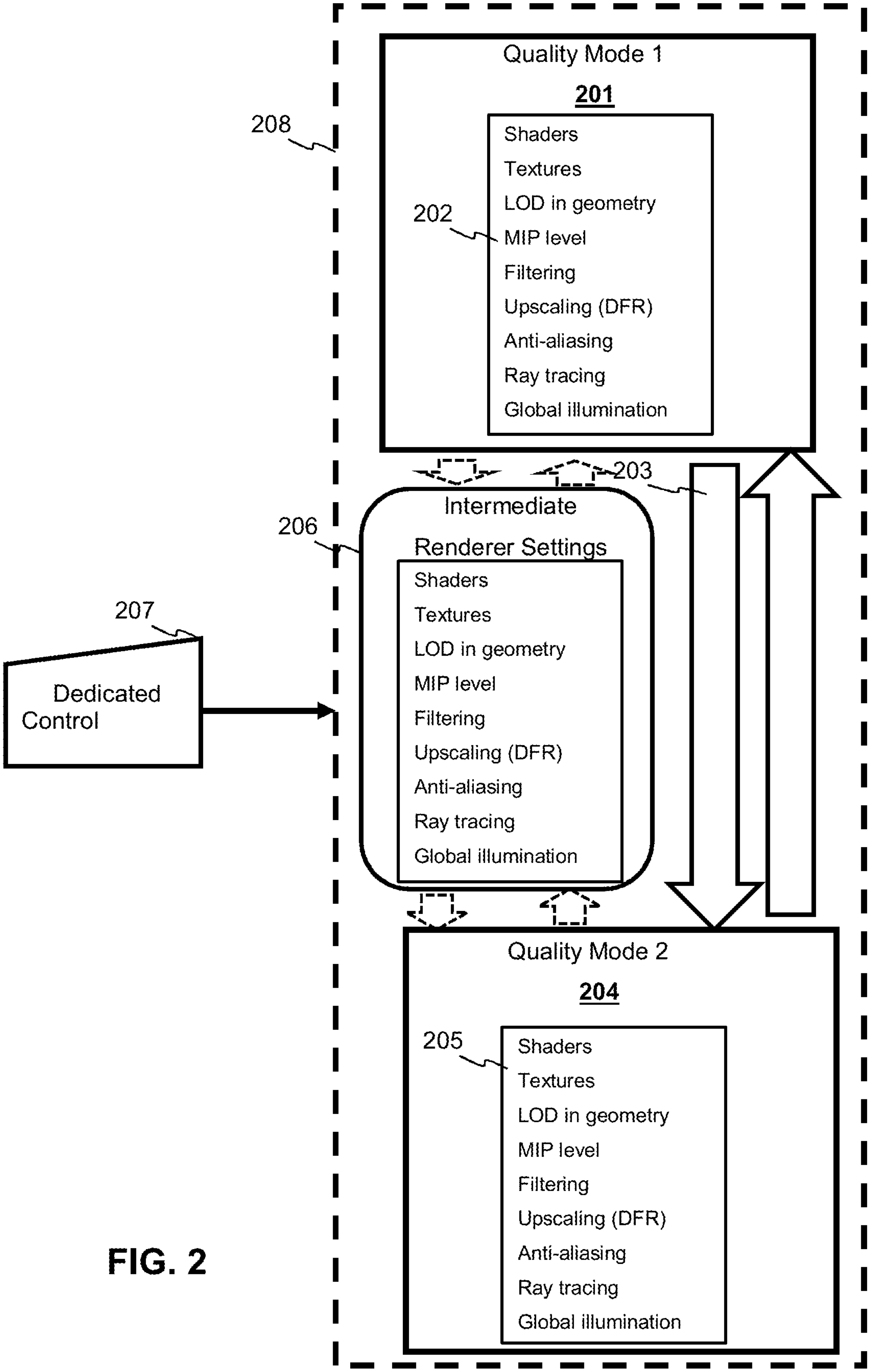
FIG. 2 is a flow diagram showing the operation of manual quality mode switching with rendering setting interpolation according to aspects of the present disclosure.

FIG. 2 is a flow diagram showing the operation of manual quality mode switching with rendering setting interpolation according to aspects of the present disclosure. As shown during execution of an application, image frames may be rendered by an application rendering process 208 according to a first quality mode 202. The first quality mode may include a first set of one or more rendering settings 202. Some or all of these rendering settings 202 may be chosen by the user of the application or by the application developer or by the device maker. The rendering settings 202 here, set by the first quality mode 201 may include but are not limited active shaders, texture resolution, Level of Detail (LOD) of geometry, MIP Map level, filtering, resolution, Anti-aliasing type, Ray tracing, and global illumination. In general, the rendering settings 202 set by the first quality mode 201 may include as few as one setting or as many as dozens of settings depending on the specifics of the application. By way of example, and not by way of limitation, the application rendering process may be implemented in hardware or software or some combination of hardware and software, e.g., by application renderer 102 of FIG. 1. The render settings 201 affect the degree to which the application rendering process is computationally intensive, e.g., in terms of process cycle utilization.

When a signal 207 indicating that the dedicated quality mode switch control has been activated, the application rendering process 208 switches at 203 from rendering the application in the first quality mode 201 to rendering the application in a second quality mode 204.

The second quality mode 204 may be characterized by a second set of one or more rendering settings 205 at least one of which has a different value than a corresponding setting of the first quality mode 201. Furthermore, some or all values of the rendering settings 205 of the second quality mode may be different than values of corresponding rendering settings 202 of the first quality mode. The rendering settings 205 of the second quality mode 204 may be more or less computationally intensive than the rendering settings values of the first quality mode 201 depending on the implementation. For example, and without limitation, if the first quality mode has less computationally intensive rendering settings (e.g., settings for speed or frame rate over image quality) the second quality mode may have more computationally intensive rendering settings (resulting in a better-quality image). Alternatively, the rendering settings values of the second quality mode may be chosen to favor application speed, or image frame quality.

In some implementations when switching from the rendering settings of the first quality mode 201 to the rendering setting of the second quality mode 204 the renderer may interpolate between the settings of the two quality modes by changing to intermediate rendering settings 206. Interpolation between the rendering settings of the first quality mode and second quality mode may make the change between settings less noticeable to the user.

Additionally, during interpolation, the application rendering process 208 may change to and from intermediate rendering settings over a period of time so that there is a gradual change between the rendering settings 202 of the first quality mode 201 and the rendering settings 205 of the second quality mode 204 and the resulting change in quality is less perceptible to the user. For example and without limitation, the device or system may dwell on the intermediate rendering settings for 2 seconds before switching to the second quality mode. It is noted that, at 60 frames per second. 2 second is sufficient time to render 120 frames. A shorter duration of dwell on the intermediate rendering settings, e.g., 1 second. 0.5, seconds or less may be sufficient in some situations. Furthermore, in some implementations there may be two or more different levels of intermediate rendering settings values that the rendering process 208 may switch through before reaching the rendering settings of the second quality mode. The intermediate rendering settings value may be any rendering setting value that is less computationally intensive than the corresponding setting value of the first quality mode and more computationally intensive that the equivalent setting of the second quality mode when the second quality mode is less computationally intensive than the first quality mode. Similarly, when the second quality mode is more computationally intensive than the first quality mode the intermediate rendering settings may be less computationally intensive than the second quality mode and more computationally intensive than the first quality mode.

Some examples of rendering settings of having intermediate settings are, without limitation, active shaders, texture resolution, LOD of geometry, MIP map level, filtering, resolution, Anti-aliasing type, path tracing, and global illumination. An intermediate setting value for active shaders may be a number of active shaders between the number of active shaders in the first quality mode and a number of active shaders in the second quality mode. For texture resolution an intermediate setting value may be a texture resolution between the texture resolution of the first quality mode and the texture resolution of the second quality mode. An intermediate level of detail of geometry value may include geometry that has an amount of tessellation between a tessellation level of the first quality mode and the second quality mode. A MIP map level that is intermediate may be a MIP map level between the MIP map level of the first quality mode and the second quality mode. The anisotropic filtering level changes the number of samples during filtering and typically has levels of for example and without limitation x2, x4, x8 and x16. Additionally, filtering may include Bi-linear and trilinear filtering settings. An intermediate level of filtering may be a filtering level between the first quality mode and second quality mode. In some instances, an intermediate filtering level may be between an anisotropic filtering level and a different filtering mode e.g. trilinear filtering between ×2 anisotropic filtering level and bilinear filtering. Super Sampling anti-aliasing levels changes the resolution of the samples taken during anti-aliasing and typically come in levels of 2×, 4×, 6×, and 8×. Additionally there are other anti-aliasing modes which are more computationally intensive such as temporal anti-aliasing and less computationally intensive such as multi-sampling. An intermediate anti-aliasing mode may be an anti-aliasing level between the antialiasing level of the first quality mode and an antialiasing level of the second quality mode. For example, and without limitation, if the first quality mode has a rendering setting value of 8× super sampling anti-aliasing mode and the second quality mode has a rendering setting value that includes a 2× super sampling anti-aliasing mode the corresponding intermediate mode setting value may be a 6× super sampling anti-aliasing mode. In another anti-aliasing example, the first quality mode may include a temporal anti-aliasing mode and the second quality mode includes no anti-aliasing mode, the intermediate rendering setting value may be multi-sample anti-aliasing. An intermediate resolution setting may simply be a resolution setting between the resolution setting of the first quality mode and the second quality mode. The intermediate resolution setting value may be chosen to maintain the aspect ratio of the display so that the image frame may be stretched to fit the screen without overly distorting the image.

As another example, for path tracing one possible setting for adjusting quality is the number of samples per pixel. Generally, a higher number of samples results in higher quality but path tracing computations take longer example. In such a case, the intermediate resolution setting may be a number of samples intermediate the high resolution setting and the low resolution setting.

A second activation of the quality mode control may generate a signal to switch back to the first quality mode 201 from the second quality mode 204. In some implementations the renderings settings may be interpolated when switching back to the first quality mode from the second quality mode. In some alternative implementations there may be three or more quality modes. In which case the device or system may switch between the two or more different quality modes based on the signal from the dedicated control 104 or 105. Additionally, rendering settings may be interpolated during switching between the three or more quality modes.

In this way a user may quickly change between for example a first quality mode that emphasizes image quality with special effects when quality is important to the user and a second quality mode that emphasizes processing speed when frame rate, or application speed, or responsiveness is important to the user. Additionally, interpolation between quality modes reduces the user's perception that there has been a loss in quality when switching to a less computationally intensive quality mode and may decrease the perception of a loss of responsiveness when switching to a more computationally intensive quality mode.

Figure 3:
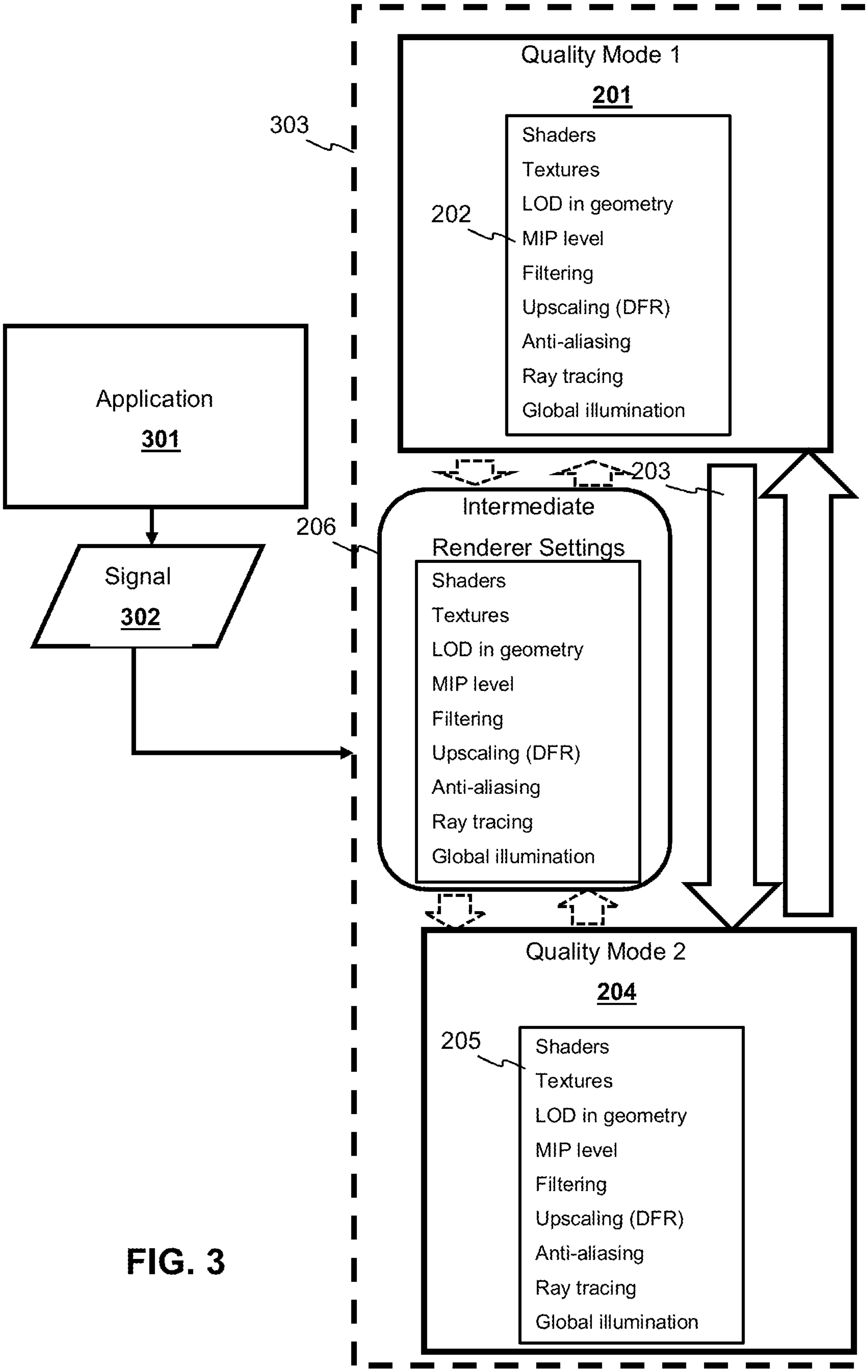
FIG. 3 is a flow diagram showing the operation of automatic quality mode switching with rendering setting interpolation according to aspects of the present disclosure.

Aspects of the present disclosure include implementations in which quality mode switching may be done automatically. For example, FIG. 3 is a flow diagram showing the operation of an implementation of automatic quality mode switching with rendering setting interpolation according to an aspect of the present disclosure. In this implementation the application rendering process 303 automatically switches between quality modes based on an application 301. An application renderer 303 may receive a signal 302 from the application 301 to switch from rendering in the first quality mode to the second quality mode. The Application 301 may for example and without limitation be programmed to send a signal 302 to the application rendering process 303 in the form of a message at different points during rendering the application. The points at which the application provides a signal to the rendering process may be chosen by the application developer. The developer may manually set points at which a quality mode switch signal is sent or may develop a custom loop for when a quality mode switch should occur. Each application may have its own set of quality modes with corresponding rendering settings. In some implementations, an existing application may have quality mode switch signals patched in by for example and without limitation application programming that detects application states that correspond to situations when a quality mode switch would be beneficial. The application developers may select the rendering settings that change between quality modes. Switching between quality modes may be performed in a manner analogous to that discussed with respect to FIG. 1 and FIG. 2 above and the rendering process 303 may also interpolate between at least some renderings settings values as part of the switch between quality modes.

Alternatively, application rendering process 303 may monitor application 301 for the signal 302 and change rendering quality modes when the signal is detected. The rendering process may for example detect certain collections of pixels or information in the frame or frame headers and use that information to change rendering modes.

In this way application developers may quickly change application rendering settings during execution of the application. Interpolation of rendering settings may reduce the perception that there has been a loss quality when switching to a less computationally intensive quality mode and may decrease the perception in loss of responsiveness when switching to a more computationally intensive quality mode.

Figure 4:
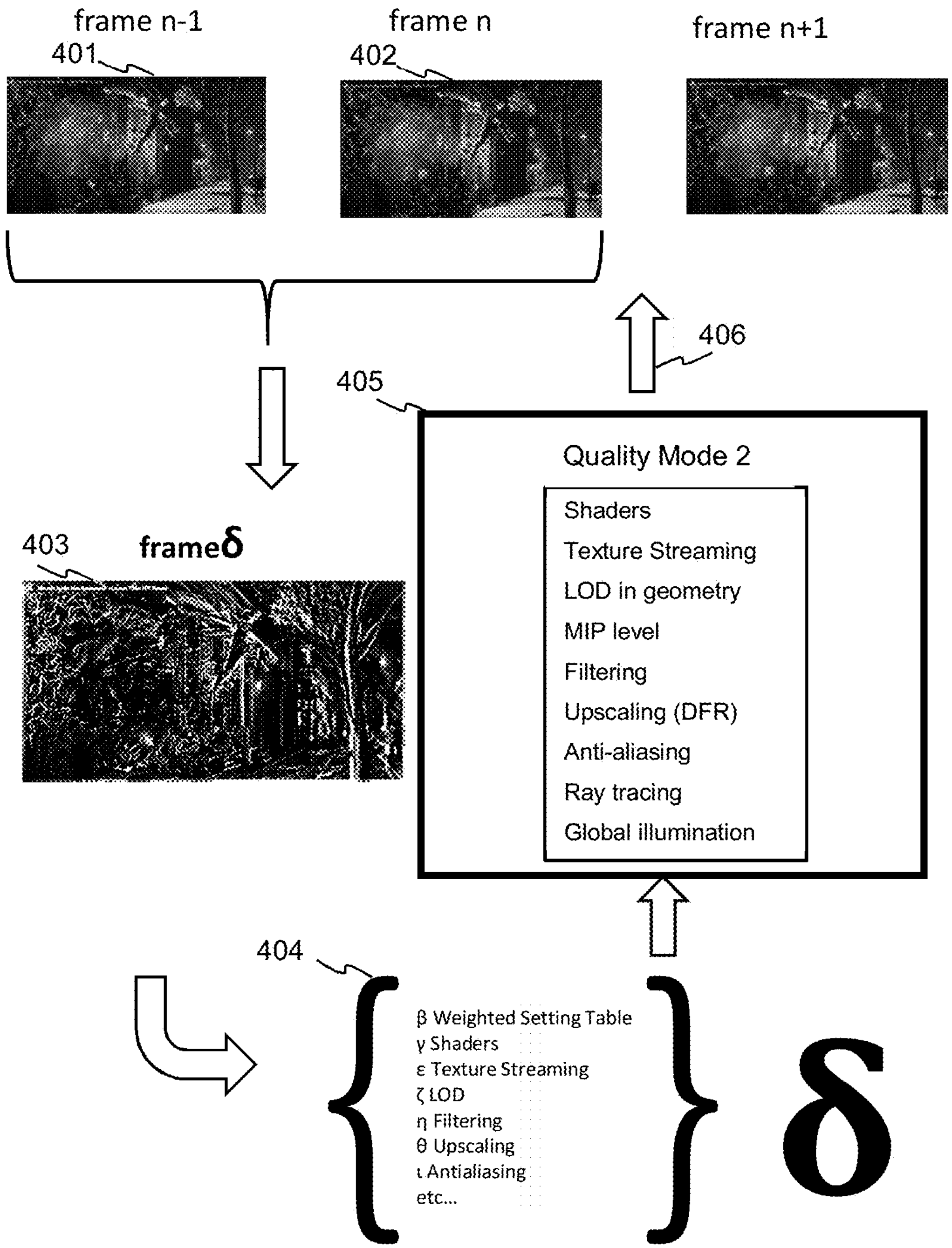
FIG. 4 is a flow diagram depicting dynamic switching between application quality modes using frame delta.

In some implementations, an application may determine whether to switch between quality modes from information about frames that are being rendered. For example, FIG. 4 is a flow diagram depicting dynamic switching between application quality modes using frame delta. As shown, a prior frame n−1 401 is rendered by the application rendering process. A current frame n 402 is then rendered by the rendering process and a delta, i.e., difference, is taken between the pixel values of frame n and the pixel values of frame n−1. Here, the pixel values may be luminance (luma) and/or chrominance (chroma) values of the pixels in the frame. Luminance generally refers to the brightness of a pixel in a video image. Chrominance generally refers to color difference values for a pixel in a video image. The delta here may be the absolute difference between elements in frame n−1 corresponding elements in frame n. The result is a delta frame 403 showing changes between frame n−1 and n.

A summation of the values in the delta frame may be taken to find an overall measure of the difference between frame n−1 and n. This summed value may then be compared to a weighted table 404 containing weighted rendering settings and thresholds for adjustment of the rendering settings based on a summed value of the pixel delta. In some implementations the summed value may be normalized to a scale between 0.0 and 1.0. For example and without limitation, a value of 0.0 is set as a static scene with no pixel changes and 1.0 is a complete scene change with no pixel values shared between frames. In this example the value of 0.0 may trigger the maximum quality settings operable (most computationally intensive settings) with the system and the quality settings may reduce as the delta approaches 1.0 with the lowest operable quality settings (least computationally intensive settings) at 1.0 thus favoring higher framerates when there is a large pixel delta. In some implementations, two frame deltas may be generated, one for luma and one for chroma. In such an implementation the table may include threshold values for each delta (e.g., one for chroma and one for luma). In some implementations some rendering settings may only affect performance when a one type of pixel value is changed, (e.g., only luma or only chroma) in such implementations the table may include a threshold for only the pixel delta that the rendering setting is effective on. As will be discussed in a later section, the rendering settings may be weighted, the weight may be based on the relative effectiveness of the rendering setting on computation intensity. For example, and without limitation, a lighter weighted setting may be a setting that has a minor effect on the application performance and a heavier weighted setting value may be one that greatly affects application performance. A more concrete nonlimiting example is when rendering an application super sample anti-aliasing mode level of 8× a setting value of super sampling anti-aliasing mode level of 4× may have a lower weight than multi-sampling anti-aliasing.

Once the rendering settings values have been selected based on the summed value of the pixel delta the selected rendering settings are applied to the second quality mode 405. The rendering process then switches to rendering frame n+1 406 in the second quality mode 405. The cycle would then repeat as frame n would become frame n−1 and frame n+1 would become frame n for the next iteration.

Thus, rendering settings may be automatically selected based on the pixel data of image frames generated by the application. The method provides the benefit of favoring image quality when there are few changes to image frames and favoring performance when there are a lot of changes to image frames. This is beneficial because oftentimes when running applications such as video games when there a lot of changes in the image it is an action sequence and performance of the application is more beneficial to the player experience than quality because application sluggishness is particularly noticeable during action sequences. Conversely when there are only small changes to images the application is likely paused or on a menu and in such cases quality of the image may provide a better user experience at the user may have a lot of time to view the image during a pause screen or in a menu.

Figure 5:
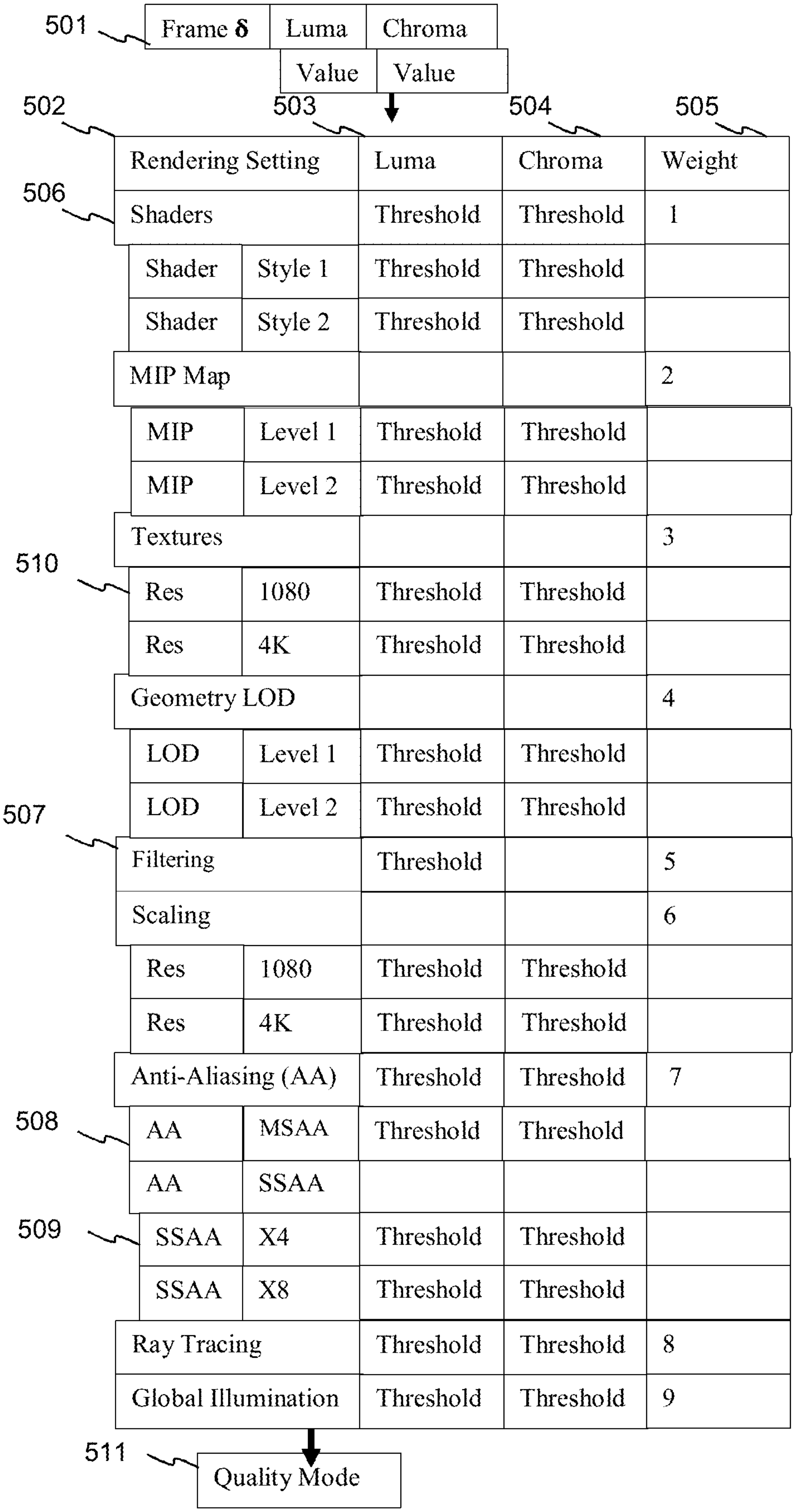
FIG. 5 is a diagram showing an example implementation of rendering setting adjustment with a weighted rendering setting table according to aspects of the present disclosure.

FIG. 5 is a diagram showing an example implementation of rendering setting adjustment with a weighted rendering setting table according to aspects of the present disclosure. Each application may have an associated rendering table. As shown the pixel delta 501 may be calculated for both chroma and luma values. A rendering setting table 502 may be used to determine changing rendering settings values. There may be many different applications that use a rendering settings table, and each different application may have a different associated table. In the implementation shown the table includes columns for Luma thresholds 503, Chroma thresholds 504 and weight 505. The rendering settings in this table are arranged by weight 503 with less computationally intensive settings (that is the settings that, when their values are changed, have a smaller effect on performance) listed first. The first setting listed in this example table is shaders 506 in the shader group there are two levels, these levels may be for example and without limitation different numbers of active shaders or different types of shaders. Each shader level has a threshold associated with the level, if the frame delta at least meets the threshold then that level of shader will be active. In this implementation the shader setting heading 506 also includes a threshold indicating that shaders will not be active if the frame delta does not meet that threshold. Another resolution setting heading shown is a texture resolution. The texture resolution setting includes a texture resolution value of 1920×1080 as the first level in a texture resolution nested group 510 and a value of 4K or 4096×2160 as the second level in the nested group. As discussed, the weights and thresholds are selected such that based on the current rendering settings values the system may change settings values using the frame delta.

For example and without limitation, if the system is rendering at 2K texture resolution and the frame delta rises and meets the 1080 threshold the system may switch to rendering texture resolution at 1920×1080 instead of 2K. Similarly, for illustration and without limitation, if the frame delta falls and meets the 4K threshold then the system may begin rendering with a 4K texture resolution. It is noted that there is a distinction between which texture levels (mip level) to use and at what resolution to render. Both can be factors in affecting the balance between quality and performance.

Another setting shown is filtering 507. The application in this implementation includes only a single filtering setting whose value is changed by toggling filtering on or off. Additionally, in this example filtering in this application was found to be only effective based on luminance changes and as such the table only includes a luma threshold.

In this implementation the application further includes multiple anti-aliasing settings. The multiple anti-aliasing settings are shown as nested groups under the anti-aliasing heading. The first subgroup is multi-sampling anti-aliasing (MSAA) 508. The second sub-heading shown is super sampling anti-aliasing (SSAA) which includes 2 sub-sub-groups, 4 times (4×) SSAA 509 and 8 times (8×) SSAA with corresponding thresholds for each value. It should be noted that the table shown is for illustrative purposes only and an actual table stored in memory may forego column labels and nested groups.

When the frame delta at least meets a threshold in the rendering settings table the rendering settings are applied to a quality mode 511 and the application rendering process may switch to the new quality mode thus rendering the next the frame of the application with the determined rendering settings.

The thresholds and weights for each rendering setting in table 502 may be determined by the application developer manually through experimentation. Alternatively in some implementations the thresholds for each rendering setting may be determined by a neural network trained with a machine learning algorithm to determine thresholds and weights for rendering settings. During training the neural network may be provided masked rendering settings, a frame pixel delta, and a system performance target. The neural network may be trained to predict the thresholds and weights of rendering settings based on the frame delta to meet the system performance target. The data may be generated by running each application with different settings and selecting the settings that meet the performance target at points during execution of the application. During training the machine learning algorithm modifies weights and transitions of the neural network based on a loss calculated between the predicted threshold and weight settings and the ground truth rendering settings determined experimentally.

In this way rendering settings may be selected automatically that match the requirements of the application. Allowing high quality rendering when processing power is not needed to run other application processes and providing lower quality when processing power is needed. This also solves the problem of low quality pause screens as during a pause screen there is no movement in the image thus favoring rendering settings for high quality.

Figure 6:
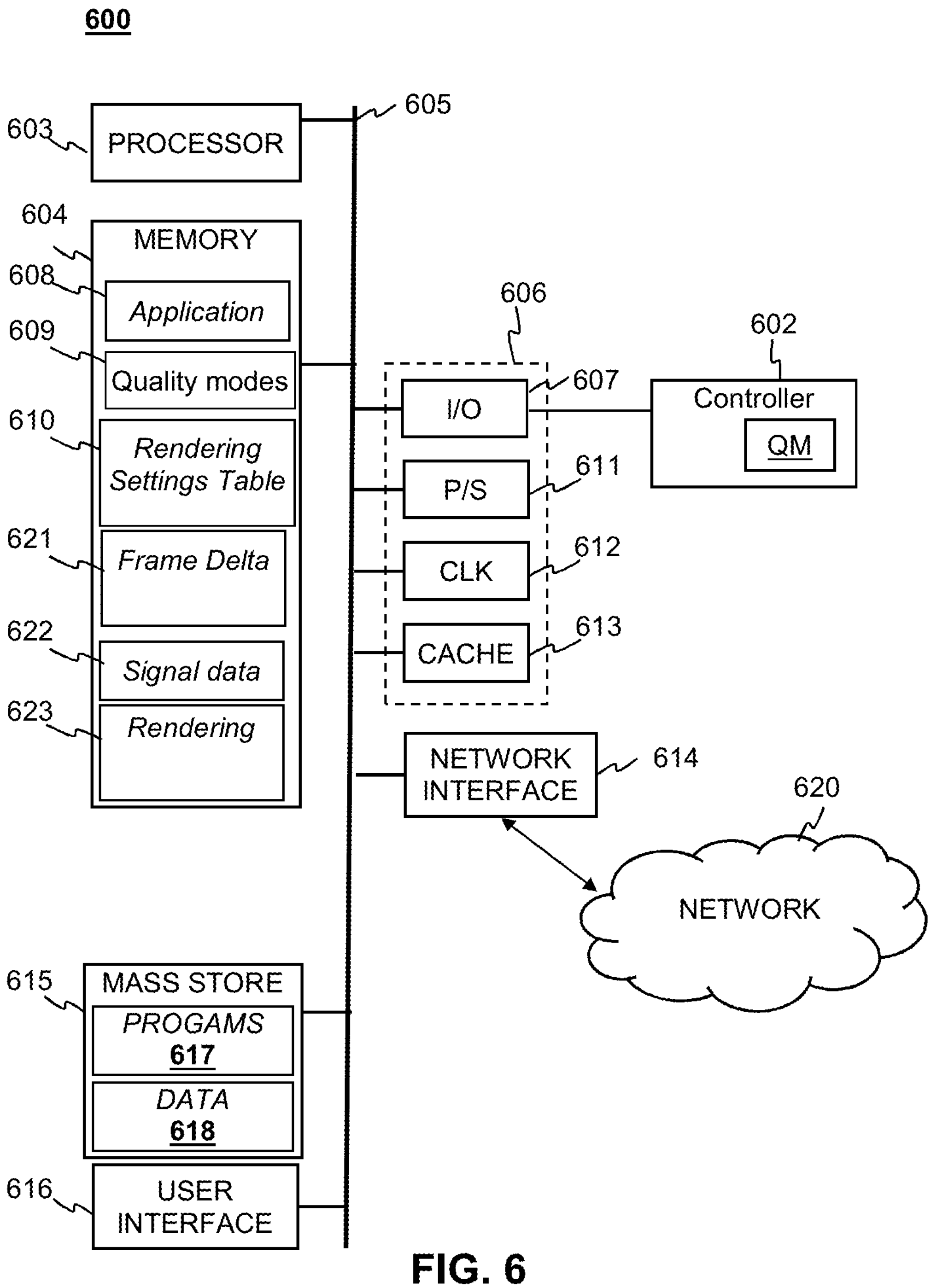
FIG. 6 is a block diagram depicting a system for quickly changing quality modes according to aspects of the present disclosure.

FIG. 6 is a block diagram depicting a system for quickly changing quality modes according to aspects of the present disclosure. The system may include a computing device 600 coupled to an application controller 602. The application controller 602 may be a game controller, touch screen, microphone or other device that allows the user to input speech data into the system. Additionally, the application controller 602 may also include one or more IMUs. The application controller 602 may include a dedicated control QM, e.g., a dedicated button for switching quality modes.

The computing device 600 may include one or more processor units and/or one or more graphical processing units (GPU) 603, which may be configured according to well-known architectures, such as, e.g., single-core, dual-core, quad-core, multi-core, processor-coprocessor, cell processor, and the like. The computing device may also include one or more memory units 604 (e.g., random access memory (RAM), dynamic random-access memory (DRAM), read-only memory (ROM), and the like).

The processor unit 603 may execute one or more programs, portions of which may be stored in memory 604 and the processor 603 may be operatively coupled to the memory, e.g., by accessing the memory via a data bus 605. The programs may include rendering programs or processes 623. Additionally, the Memory 604 may contain applications 608 that may generate image frames to be rendered by the rendering programs 623 during execution. Memory 604 may also contain data such as a rendering settings thresholds or tables 610, quality modes 609, and signal data, used by the rendering programs 623 while carrying out the methods for quickly switching quality modes shown in FIG. 2, FIG. 3 and FIG. 4. In some implementations the system may also include a neural network trained with a machine learning algorithm to determine weights and thresholds for the rendering setting table 610. In some implementations the rendering program or processes and other sufficient code for a computer to carry out the methods for quickly switching quality modes as shown inf FIG. 2, FIG. 3 and FIG. 4 may be stored as computer executable instructions in a non-transitory computer readable medium and when executed by the system may cause the system to carry such methods.

The computing device 600 may also include well-known support circuits, such as input/output (I/O) 607, circuits, power supplies (P/S) 611, a clock (CLK) 612, and cache 613, which may communicate with other components of the system, e.g., via the data bus 605. The computing device may include a network interface 614. The processor unit 603 and network interface 614 may be configured to implement a local area network (LAN) or personal area network (PAN), via a suitable network protocol, e.g., Bluetooth, for a PAN. The computing device may optionally include a mass storage device 615 such as a disk drive, CD-ROM drive, tape drive, flash memory, or the like, and the mass storage device may store programs and/or data. The computing device may also include a user interface 616 to facilitate interaction between the system and a user. The user interface may include a keyboard, mouse, light pen, game control pad, touch interface, or other device.

The computing device 600 may include a network interface 614 to facilitate communication via an electronic communications network 620. The network interface 614 may be configured to implement wired or wireless communication over local area networks and wide area networks such as the Internet. The system 600 may send and receive data and/or requests for files via one or more message packets over the network 620. Message packets sent over the network 620 may temporarily be stored in a buffer in memory 604. In some implementations the system may operate remotely with a system sending compressed rendered image frames over the network 620 to a thin client device and receiving inputs for the application from the thin client device. In some such implementations, e.g., involving adaptive streaming algorithms, network conditions may be taken into account in adjusting rendering settings values in addition to other considerations, such as frame delta. Adjustment of the render settings values may also affect compressibility of the image data.

Aspects of the present disclosure provide for efficient switching between video quality modes in ways that minimize disruption of the user's experience of an application. While specific embodiments have been provided to demonstrate switching between video quality modes, these are described by way of example and not by way of limitation. Those skilled in the art having read the present disclosure will realize additional embodiments falling within the spirit and scope of the present disclosure.

It should be understood that the various embodiments and implementations described herein may be combined or assembled into specific implementations using the various features disclosed herein. Thus, the examples provided are just some possible examples, without limitation to the various implementations that are possible by combining the various elements to define many more implementations. In some examples, some implementations may include fewer elements, without departing from the spirit of the disclosed or equivalent implementations.

Aspects of the present disclosure may be practiced with various computer system configurations including hand-held devices, microprocessor systems, microprocessor-based or programmable consumer electronics, minicomputers, mainframe computers and the like. Embodiments of the present disclosure can also be practiced in distributed computing environments where tasks are performed by remote processing devices that are linked through a wire-based or wireless network.

With the above implementations and embodiments in mind, it should be understood that aspects of the present disclosure can employ various computer-implemented operations involving data stored in computer systems. These operations are those requiring physical manipulation of physical quantities. Any of the operations described herein that form part of embodiments of the present disclosure are useful machine operations. Embodiments of the invention also relate to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The disclosure can also be embodied as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing disclosure has been described in some detail for purposes of clarity of understanding, it will be apparent that certain changes and modifications can be practiced within the scope of the appended claims. Accordingly, the present embodiments are to be considered as illustrative and not restrictive, and embodiments of the present disclosure is not to be limited to the details given herein, but may be modified within the scope and equivalents of the appended claims.

What is claimed is:

1. A device comprising:

an application renderer configured to render a first application image frame of an application in a first quality mode and automatically switch to render a second application image frame of the application in a second quality mode when a signal is detected from the application after an event, wherein the signal comprises a rendering mode switch message generated by the application and is received based at least in part on at least one of: (i) pre-determined in-application criteria or (ii) rendering information.

2. The device of claim 1, wherein the pre-determined in-application criteria includes at least one of: developer specified points, a custom loop, or application state detection logic.

3. The device of claim 1, wherein the signal is detected from image frames of the application.

4. The device of claim 1, wherein the rendering information includes information about frames being rendered.

5. The device of claim 1, wherein the signal indicates rendering settings values of the second quality mode.

6. The device of claim 1, wherein the application renderer is further configured interpolate between rendering settings of values the first quality mode and rendering settings values of the second quality mode over a period of time before arriving at the rendering settings of the second quality mode.

7. The device of claim 1, wherein the rendering information comprises a frame to frame pixel delta of luminance and/or chrominance computed between consecutive rendered frames of the application.

8. The device of claim 1, wherein switching from the first quality mode to the second quality mode comprises interpolating via intermediate rendering settings for a dwell period before arriving at the second quality mode.

9. A system comprising:

a processor;

a memory coupled with the processor wherein the memory includes non-transitory instructions stored with the memory that when executed with the processor cause the processor to facilitate a method comprising:

rendering a first application image frame of an application in a first quality mode; and automatically switching quality to render a second application image frame of the application in a second quality mode when a signal is detected from the application after an event, wherein the signal comprises a rendering mode switch message generated by the application and is received based at least in part on at least one of: (i) pre-determined in-application criteria or (ii) rendering information.

10. The system of claim 9, wherein the pre-determined in-application criteria includes at least one of: developer specified points, a custom loop, or application state detection logic.

11. The system of claim 9, wherein the signal is detected from image frames of the application.

12. The system of claim 9, wherein the signal is detected from code of the application.

13. The system of claim 9, wherein the signal indicates rendering settings values of the second quality mode.

14. The system of claim 9, wherein the non-transitory instructions further include interpolating between rendering settings values of the first quality mode and rendering settings values of the second quality mode over a period of time before arriving at the rendering settings values of the second quality mode.

15. A non-transitory computer readable medium having stored thereon computer executable instructions wherein the executable instructions when executed by a computer cause the computer to carry out a method comprising:

rendering a first application image frame of an application in a first quality mode; and automatically switching quality to render a second application image frame of the application in a second quality mode when a signal is detected from the application after an event, wherein the signal comprises a rendering mode switch message generated by the application and is received based at least in part on at least one of: (i) pre-determined in-application criteria or (ii) rendering information.

16. The non-transitory computer readable medium of claim 15, wherein the pre-determined in-application criteria includes at least one of: developer specified points, a custom loop, or application state detection logic.

17. The non-transitory computer readable medium of claim 15, wherein the signal is detected from image frames of the application.

18. The non-transitory computer readable medium of claim 15, wherein the signal is detected from code of the application.

19. The non-transitory computer readable medium of claim 15, wherein the signal indicates rendering settings of the second quality mode.

20. The non-transitory computer readable medium of claim 15, wherein the executable instructions further include interpolating between rendering settings values of the first quality mode and rendering settings values of the second quality mode over a period of time before arriving at the rendering settings values of the second quality mode.

* * * * *